(12) United States Patent
Hou et al.

(10) Patent No.: US 10,638,217 B2
(45) Date of Patent: Apr. 28, 2020

(54) PRESSURE-RESPONSIVE SENSORS AND RELATED SYSTEMS AND METHODS

(71) Applicant: Apple Inc., Cupertino, CA (US)

(72) Inventors: Kang Hou, Milpitas, CA (US); Guohua Sun, Santa Clara, CA (US); Xiang Zhou, Cupertino, CA (US); Yu-Chun Hsu, Pittsburgh, PA (US); Junye Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/180,629

(22) Filed: Nov. 5, 2018

(65) Prior Publication Data

US 2020/0107113 A1 Apr. 2, 2020

Related U.S. Application Data

(60) Provisional application No. 62/737,767, filed on Sep. 27, 2018.

(51) Int. Cl.
| | |
|---|---|
| *H04B 15/00* | (2006.01) |
| *H04R 1/28* | (2006.01) |
| *H04R 29/00* | (2006.01) |
| *G01L 19/02* | (2006.01) |
| *H04R 3/00* | (2006.01) |

(52) U.S. Cl.
CPC ............ *H04R 1/2873* (2013.01); *G01L 19/02* (2013.01); *H04R 29/004* (2013.01); *H04R 2410/01* (2013.01); *H04R 2499/11* (2013.01)

(58) Field of Classification Search
CPC ................ H04R 1/2873; H04R 29/004; H04R 2410/01; H04R 2499/11; G01L 19/02

USPC ......................................... 381/94.8, 92, 94.1
See application file for complete search history.

(56) References Cited

U.S. PATENT DOCUMENTS

| | | | |
|---|---|---|---|
| 9,351,068 B2 | 5/2016 | Slupeiks et al. | |
| 2008/0226098 A1 | 9/2008 | Haulick et al. | |
| 2013/0195299 A1* | 8/2013 | Iseberg ............... | A61B 5/7203 |
| | | | 381/315 |
| 2014/0369512 A1 | 12/2014 | Slupeiks et al. | |
| 2015/0304786 A1 | 10/2015 | Partio et al. | |
| 2016/0050488 A1* | 2/2016 | Matheja ............... | H04R 3/005 |
| | | | 381/56 |
| 2017/0230758 A1* | 8/2017 | Kuntzman ............. | H04R 19/04 |

(Continued)

*Primary Examiner* — Ammar T Hamid
(74) *Attorney, Agent, or Firm* — Ganz Pollard, LLC

(57) ABSTRACT

An audio appliance includes a microphone transducer having an acoustically sensitive region to convert incident acoustic energy to a corresponding output signal and a barometric transducer having a pressure-responsive region to convert an ambient pressure to a corresponding output signal. The audio appliance also has an acoustic housing defining a chamber to fluidly couple the microphone transducer with the barometric transducer, together with a processor and a memory containing instructions. The instructions, when executed by the processor, cause the audio appliance to determine a presence or an absence of an ambient impairment to the microphone transducer based at least in part on the output signal from the barometric transducer. Responsive to a determined presence of an ambient impairment to the microphone transducer, the instructions, when executed by the processor, cause the audio appliance to mitigate effects of the ambient impairment.

23 Claims, 5 Drawing Sheets

(56) References Cited

U.S. PATENT DOCUMENTS

2018/0317022 A1 11/2018 Evans et al.
2019/0014429 A1* 1/2019 Luke .................... H04R 29/004

* cited by examiner

PRESSURE-RESPONSIVE SENSORS AND RELATED SYSTEMS AND METHODS

FIELD

This application and related subject matter (collectively referred to as the "disclosure") concern pressure-responsive sensors, and related systems and methods. More particularly, but not exclusively, this disclosure pertains to acoustic and ambient pressure sensors, and related systems and methods.

BACKGROUND INFORMATION

In modern consumer electronics, portable computing appliances such as, for example, laptops, notebooks, tablet computers, smart phones and portable timepieces lack sufficient space to house relatively large devices (e.g., microphones, speakers, accelerometers, barometric and other ambient pressure sensors, memory, processing units, or the like). Thus, the sizes of devices used in such appliances are becoming more and more compact and decreasing in size. The various devices, however, perform different functions (e.g., sound pick-up, pressure sensing, etc.), and more than one signal conditioning unit or circuit must typically be incorporated into an appliance for processing of the different signals. Therefore, a number of different devices (e.g., transducers, sensors and/or processing units) must typically be incorporated into portable computing appliances, leading to product space and integration challenges that are not solved merely by reducing the sizes of each of these components individually.

Moreover, many portable computing and communication appliances are used in a variety of environments and under a variety of environmental conditions. Such conditions may include, for example, wind or rain, noisy crowds or other environments with background noise. Further, many portable computing and communication appliances are used in dynamic situations and may transition from one environment to another environment during a period of use. Under those conditions, an appliance's ability to observe a given audio source may be impaired. For example, a microphone port in the appliance can become partially or wholly occluded by a user's hand or rain. Scratching or handling of the appliance, or wind blowing across or into the microphone port, can induce pressure fluctuations around a microphone's acoustically sensitive region and impair (or even obscure) observations of an intended audio source. Moreover, such conditions can cause a microphone clipping. Such acoustic challenges are not solved merely by avoiding such uses or conditions.

SUMMARY

Principles and concepts disclosed herein overcome many problems in the prior art and address one or more of the aforementioned or other needs. For example, aspects of a microphone transducer and aspects of a barometric or other ambient pressure transducer can be combined into a single sensor. Moreover, output from such a combination sensor can be used to detect audio impairments, e.g., wind or handling noise, or an occluded microphone port, and/or to mitigate one or more effects of the impairments, e.g., by modifying one or more output signals from the combination sensor.

According to a first aspect, an audio appliance includes a microphone transducer having an acoustically sensitive region to convert incident acoustic energy to a corresponding output signal and a barometric transducer having a pressure-responsive region to convert an ambient pressure to a corresponding output signal. The audio appliance also has an acoustic housing defining a chamber to fluidly couple the microphone transducer with the barometric transducer, together with a processor and a memory containing instructions. The instructions, when executed by the processor, cause the audio appliance to determine a presence or an absence of an ambient impairment to the microphone transducer based at least in part on the output signal from the barometric transducer. Responsive to a determined presence of an ambient impairment to the microphone transducer, the instructions, when executed by the processor, cause the audio appliance to mitigate effects of the ambient impairment.

The instructions that, when executed by the processor, cause the audio appliance to determine the presence or the absence of the ambient impairment to the microphone transducer can include instructions that, when executed by the processor, cause the audio appliance to determine the presence or the absence of the ambient impairment based on a comparison of the output signal from the barometric transducer with a threshold signal.

The threshold signal can be or include the output signal from the microphone transducer.

The instructions that, when executed by the processor, cause the audio appliance to mitigate effects of the ambient impairment can include instructions that, when executed by the processor, cause the audio appliance to estimate an acoustic signal corresponding to the ambient impairment and to subtract the estimated acoustic signal from the output of the microphone. For example, such instructions, when executed by the processor, can cause the audio appliance to estimate the acoustic signal based at least on the output signal from the barometric transducer.

The microphone transducer can be a first microphone transducer. The audio appliance can further include a second microphone transducer. And, the instructions that, when executed by the processor, cause the audio appliance to mitigate effects of the ambient impairment can include instructions that, when executed by the processor, cause the audio appliance to receive output from the second microphone transducer and to ignore (e.g., interrupt or terminate) output from the first microphone transducer.

According to a second aspect, pressure-responsive devices are described. A pressure-responsive device can include an enclosure defining an acoustic chamber. The enclosure can further define a port acoustically coupling the acoustic chamber with an external environment (e.g., an ambient environment or a region external of, for example, a component package housing the pressure responsive device). The pressure-responsive device can include a first pressure-responsive region exposed to the acoustic chamber. The first pressure-responsive region can be responsive to a first range of pressure conditions. The pressure-responsive device can include a second pressure-responsive region exposed to the acoustic chamber. The second pressure-responsive region can be responsive to a second range of pressure conditions. The pressure-responsive device also can include output circuitry configured to output a first signal corresponding to a response of the first pressure-responsive region to a pressure condition in the acoustic chamber. The output circuitry can further be configured to output a second signal responsive to the pressure condition in the acoustic chamber being outside the first range of pressure conditions.

For example, the second signal can correspond to a response of the second pressure-responsive region to the pressure condition in the acoustic chamber.

The pressure-responsive device can also include compensation circuitry configured to modify the first signal in correspondence with a response of the second pressure-responsive region to the pressure condition in the acoustic chamber.

In an embodiment, the second signal can be a modified version of the first signal.

The first range of pressure conditions can include frequencies up to about 40 kHz and amplitudes between about 25 milli-Pascal (mPa) and about 100 Pascal (Pa) above a reference pressure.

The first pressure-responsive region can be responsive to the first range of pressure conditions without clipping.

The second pressure-responsive region can be responsive to the second range of pressure conditions without clipping. In an embodiment, the second range of pressure conditions include a pressure greater than about 100 Pascal (Pa) above a reference pressure (e.g., atmospheric pressure).

A pressure-responsive device can include compensation circuitry. The compensation circuitry can be configured to modify the first signal responsive to the pressure condition in the acoustic chamber being outside the first range of pressure conditions. As an example, the compensation circuitry can be configured to interrupt the first signal responsive to the pressure condition in the acoustic chamber being outside the first range of pressure conditions.

The audio appliance can include circuitry configured to determine a presence or an absence of an ambient impairment to the port. The circuitry configured to determine the presence or the absence of an ambient impairment can further be configured to make the determination based on a comparison of the output signal from the second sensitive region with a threshold. The threshold can be an upper threshold of the first range of pressure conditions. The circuitry can be further configured to mitigate effects of the ambient impairment responsive to a determined presence of an ambient impairment to the port.

According to another aspect, an audio appliance can include a housing having a housing wall defining a port open to a region external of the housing. An acoustic chamber is positioned within the housing. The port acoustically couples the acoustic chamber with the region external of the housing. The audio appliance includes a pressure-responsive transducer with a first pressure-responsive region and a second pressure-responsive region. The first pressure-responsive region is responsive to a first range of pressure conditions and the second pressure-responsive region is responsive to a second range of pressure conditions. The first pressure-responsive region is acoustically coupled with the acoustic chamber and the second pressure-responsive region is acoustically coupled with the acoustic chamber. The pressure-responsive transducer is configured to output a signal corresponding to one or both of a response of the first pressure-responsive region to a pressure condition in the acoustic chamber and a response of the second pressure-responsive region to a pressure condition in the acoustic chamber. The audio appliance also includes circuitry configured to modify an output from the pressure-responsive transducer responsive to a pressure condition in the acoustic chamber being outside the first range of pressure conditions.

Also disclosed are associated methods, as well as tangible, non-transitory computer-readable media including computer executable instructions that, when executed, cause a computing environment to implement one or more methods disclosed herein. Digital signal processors embodied in software, firmware, or hardware and being suitable for implementing such instructions also are disclosed.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION

Figure 1:
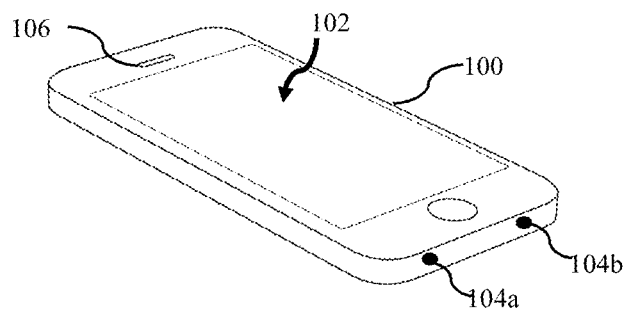
FIG. 1 illustrates a perspective view of a mobile communication device.

The following describes various principles related to pressure-responsive sensors, such as, for example, combination sensors having a plurality of pressure-sensitive regions, with each such region being responsive to a corresponding range of pressure conditions. As well, this disclosure describes various principles related systems and methods relating to such components. In one aspect, such combination sensors can be incorporated in systems (and used in methods) to detect and mitigate effects of impairments to intended audio signals. For example, some disclosed principles pertain to systems, methods, and components to identify a presence or a class of an impairment from observations of ambient pressure and acoustic signals output by a combination sensor.

That said, descriptions herein of specific appliance, apparatus or system configurations, and specific combinations of method acts, are but particular examples of contemplated sensors, components, appliances, systems, and methods chosen as being convenient illustrative examples of disclosed principles. One or more of the disclosed principles can be incorporated in various other sensors, components, appliances, systems, and methods to achieve any of a variety of corresponding, desired characteristics. Thus, a person of ordinary skill in the art, following a review of this disclosure, will appreciate that sensors, components, appliances, systems, and methods having attributes that are different from those specific examples discussed herein can embody one or more presently disclosed principles, and can be used in applications not described herein in detail. Such alternative embodiments also fall within the scope of this disclosure.

I. Overview

A portable electronic appliance can define an acoustic chamber and a port acoustically coupling the chamber with the appliance's local ambient. When the port to the acoustic chamber is exposed to wind-noise, becomes occluded, or is subjected to handling or scratching, a pressure in the acoustic chamber can dramatically change, even if only temporarily. A typical microphone transducer, exposed to high-pressures relative to the range of intended pressure conditions over which the transducer operates, may clip or otherwise distort or degrade. Such signal impairments may degrade perceptual quality of observed audio (e.g., real-time playback or recorded audio), or may altogether render an output signal from the microphone useless. Moreover, an electronic appliance that incorporates a conventional microphone transducer may combine its output signal with one or more other microphone signals for any of a variety of purposes (e.g., voice-activity detection, echo cancellation, noise suppression, speech recognition, beam forming, etc.). Accordingly, when a local ambient or other pressure condition exceeds the range of conditions over which a conventional microphone is sensitive, performance of an electronic appliance incorporating the microphone may degrade.

However, a combination sensor of the type described herein can alleviate such problems. As an illustrative example, a pressure-responsive device can have sufficient sensitivity over a range of pressure conditions to observe pressure variations arising from an audio source, as well as pressure variations arising from changes to a local ambient environment. To provide sufficient sensitivity over such a wide range of pressure conditions, a pressure-responsive device can combine more than one pressure-sensitive region within a single device. In turn, each pressure-sensitive region can be responsive to pressure over a corresponding range of pressure conditions.

For instance, a pressure-responsive device can have a first pressure-sensitive region responsive to sound (e.g., pressure fluctuations within a range of frequencies and a range of amplitudes). A range of frequency conditions for sound can be between about 20 Hz and about 50 kHz, such as, for example, between about 30 Hz and about 45 kHz, or between about 40 Hz and about 40 kHz. A range of amplitude conditions for sound can be less than about 100 Pascal (Pa, equivalent to a sound-pressure level of about 134 dB), such as, for example, between about 50 milli-Pascal and about 100 Pa, or between about 100 milli-Pascal and about 90 Pa.

Continuing with the example, the pressure-responsive device can have a second pressure-sensitive region responsive to changes in ambient (e.g., barometric) pressures (e.g., pressure fluctuations typically occurring over lower frequencies than sound and typically having a range of amplitudes greater than sound). A range of frequency conditions over which barometric pressure varies can be less than about 50 Hz, such as, for example, less than about 35 Hz, or less than about 1 Hz. A range of amplitude conditions for ambient pressure changes can be as high as about 10 kilo-Pascal (kPa), such as between about 8 kPa and about 12 kPa, or greater, and standard atmospheric pressure is 101.325 kPa.

Processing and/or filtering of the signal(s) output by each pressure-responsive region of the pressure-responsive device can identify one or more selected classes of impairments to an acoustic signal based on an output from such a pressure-responsive device. Further processing and/or filtering (e.g., selected in correspondence with an identified class of impairment) can mitigate effects of such an impairment on an output from a pressure-responsive device having more than one pressure-responsive region.

As well, a pressure-responsive device having more than one pressure-responsive region can include an integrated circuit (IC), e.g., an application-specific integrated circuit (ASIC). An ASIC may be a single IC chip adapted for processing and/or filtering of the signal(s) output by each pressure-responsive region of the pressure-responsive device. In this aspect, multiple functions (e.g., ambient pressure sensing, acoustic sensing, impairment classifying, and impairment mitigating) may be performed by a single, combined sensing and processing device incorporating an IC, thus reducing or eliminating the need for multiple devices to perform each of these functions. Consequently, computational overhead can be shifted away from a general-purpose processing unit in a portable electronic appliance and imposed on, e.g., an ASIC incorporated in or otherwise associated with a pressure-responsive device having more than one pressure-responsive region.

II. Electronic Appliances

Figure 2:
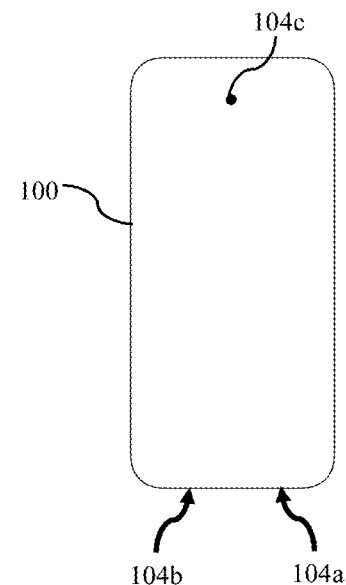
FIG. 2 illustrates a plan view of a backside of the mobile communication device shown in FIG. 1.

FIG. 1 shows a perspective view of an example of a portable electronic appliance 100, and FIG. 2 shows a plan view of a back side of the appliance 100. A portable electronic appliance may include, for example and without limitation, a digital audio recorder, a digital video recorder, a handheld computing device such as, for example, a smartphone or a tablet computer, a digital camera capable of recording audio and video, a wearable electronic device, a smart speaker, an electronic device capable of voice interaction such as a voice-capable remote control, a laptop computer, or other audio appliance. In the illustrated example, the portable electronic appliance is a mobile-communications device, sometimes referred to colloquially as a "smartphone."

The portable electronic appliance 100 may include a display 102. The display 102 may present visual elements to the user of the device, e.g., images, text, user interface elements. When the device 100 includes a camera, the display 102 may present a visual scene observed by the camera, as when the camera is in use.

As indicated in FIGS. 1 and 2, the device 100 may include one or more pressure-responsive sensors, such as, for example, combination sensors having a plurality of pressure-sensitive regions, with each such region being responsive to a corresponding range of pressure conditions, e.g., pressure-responsive sensors 104a, 104b, 104c. The pressure-responsive sensors 104 may be used to observe an intended audio source by a variety of applications, such as, for example, by a telephony application, a video recording application, an audio recording application, and/or by a digital assistant application.

The appliance 100 may further include a speaker 106. The speaker 106 may output audio signals, for example, and without limitation, from a music player application, from the telephony application, from a video player application, and/or from the digital assistant application.

The appliance 100 may include other input and output components (not shown), such as, for example, a camera, a light, an actuator to provide a haptic response, and a wired or a wireless communication connection.

One or more functional components of a portable electronic appliance can identify any of a variety of conditions that may negatively affect or otherwise impair a perceptual quality of observed or recorded audio, including in real time. Moreover, one or more functional components can mitigate, or eliminate, effects of certain impairment conditions. The functional components may be implemented in software, firmware and/or hardware instructions. As well, the functional components may be wholly implemented in an IC in a pressure-responsive device, distributed between or among an IC in a pressure-responsive device and another processing unit (e.g., software, firmware, or hardware) in the appliance 100, or may be wholly implemented in a processing unit (e.g., software, firmware, or hardware) in the appliance 100. For example, circuitry of the IC can be inside a packaged pressure-responsive device, outside of the packaged pressure-responsive device, or distributed between inside the packaged pressure-responsive device and outside the packaged pressure-responsive transducer (e.g., elsewhere in the audio appliance).

Similarly, the functional components may be specific to a recording application on a portable electronic appliance, or may be available for use by a plurality of applications on the appliance.

Figure 3:
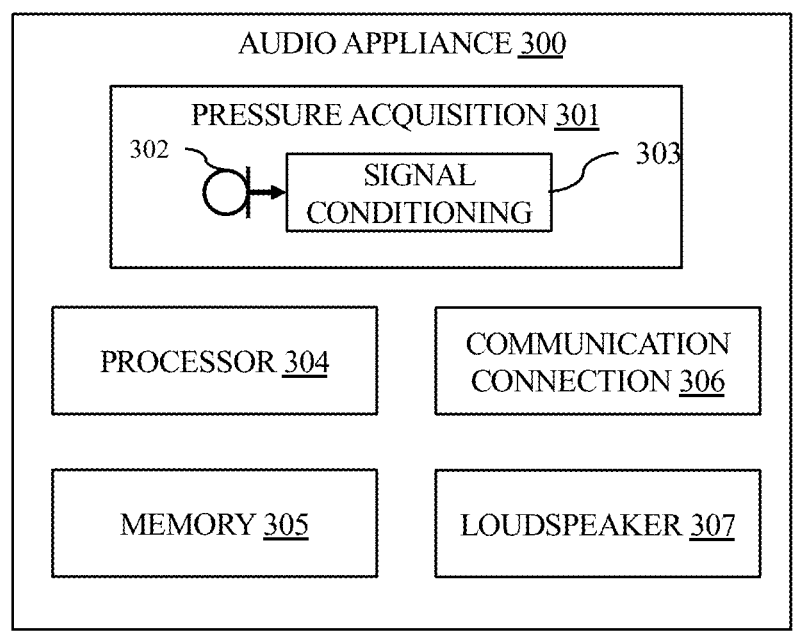
FIG. 3 illustrates a block diagram showing aspects of an audio appliance.
Figure 6:
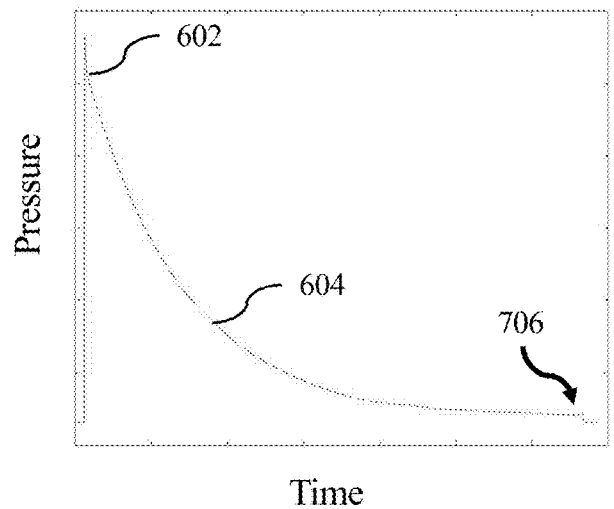
FIGS. 6, 7, 8, and 9 depict examples of pressure conditions arising from various ambient impairment conditions.

FIG. 3 shows an example of a suitable architecture for an audio appliance 300 that can receive audio- and other pressure-input signals and prepare the signals for a processing unit. The audio appliance 300 includes an audio acquisition module 301, including a combination sensor of the type described herein, as well as aspects of a computing environment (e.g., described more fully below in connection with FIG. 6) that can cause the appliance to respond to an ambient environment in a defined manner, e.g., as described above in connection with detecting one or more pressure conditions and/or mitigating an effect of such a condition on an observation of an intended audio source.

As shown in FIG. 3, the audio acquisition module 301 can include a combination sensor 302 described herein and a signal conditioner 303 to process and/or filter, or otherwise condition, the representation of ambient pressure acquired by the combination sensor 302. Some audio appliances also have an analog microphone transducer and a pre-amplifier to condition the signal from the microphone.

The illustrated appliance 300 includes a processing unit 304 and a memory 305 that contains instructions the processing unit can execute to cause the audio appliance to, e.g., carry out one or more aspects of acquiring one or more pressure signals, extracting information from the acquired pressure signal, analyzing the acquired pressure signal, identify one or more ambient conditions in light of the analyzed pressure signal, and provide an output corresponding to the identified condition. For example, such instructions can cause the audio appliance 300, with the pressure acquisition module 301, to capture an output from the combination sensor 302 corresponding to observed pressure conditions and to separate, e.g., an audio signal from an impairment signal.

III. Pressure-Responsive Devices

As used herein, the term "pressure-responsive device" refers to a device or component that responds to pressure. A pressure-responsive device may incorporate a device, component, or sensor that has a characteristic that changes with, or is sensitive to pressure.

Referring still to FIG. 3, an audio appliance can include a pressure-responsive device having at least one pressure-sensitive region being responsive to a range of pressure conditions typical of audio sources. Such a pressure-responsive device is typically referred to as a "microphone" or a "microphone transducer." As used herein, the terms "microphone" and "microphone transducer" are used interchangeably and mean an acoustic-to-electric transducer or sensor that converts an incident acoustic signal, or sound, into a corresponding electrical signal representative of the incident acoustic signal. Although a microphone responds to variations in pressure (e.g., sound), the term "pressure-responsive device" refers more generally to devices responsive to any range of pressure conditions. Thus, a microphone transducer represents a selected class of pressure-responsive devices.

A "combination sensor" or a "combination device," on the other hand, may be used interchangeably and refer herein to sensors or devices having at least a first pressure-sensitive region being responsive to a first range of pressure conditions and a second pressure-sensitive region responsive to a second range of pressure conditions. Thus, a combination sensor represents a class of pressure-responsive sensors different from a microphone transducer, though some combination sensors may be considered as microphone transducers to the extent that at least one of the corresponding pressure-sensitive regions in a combination device is responsive to sound.

Although a single combination sensor 302 is depicted in FIG. 3, the use of plural combination sensors is contemplated by this disclosure (e.g., as indicated by the plural combination sensors 104a, 104b, 104c in FIGS. 1 and 2). For example, plural combination sensors can be used to observe plural ambient pressure conditions emanating from a given acoustic scene, and the plural versions can be processed independently and/or in combination with each other before further processing by the audio appliance 300.

Output from a pre-amplifier or other conditioner can be low-pass filtered before being sampled by an analog-to-digital converter (ADC), though the output need not be low-pass filtered prior to sampling. In some instances, the ADC can employ Sigma-Delta modulation, followed by a decimation filter to down-sample the digital signal.

Referring still to FIG. 3, for example, an analog output from a microphone portion of the combination sensor 302 can be low-pass filtered and subsequently sampled at or above a Nyquist frequency (i.e., twice the highest frequency component in the underlying signal to be sampled) relative to a selected passband, e.g., having an upper-frequency threshold corresponding to human hearing, to generate a stream of acoustic data corresponding to the analog audio signal acquired by the combination sensor 302. A processing unit that performs the filtering and sampling can be incorporated in a combination sensor, distributed between or among a plurality of modules, some of which can be on the sensor 302 or elsewhere in the audio appliance 300, or entirely off the sensor 30. Assuming ambient sounds of interest have an upper threshold frequency of about 20 kHz, a sampling frequency above about 40 kHz can accurately capture an audio source of interest. One or more other output signals from the combination sensor 302, e.g., corresponding to pressure conditions other than sound, can be filtered and/or processed according to characteristic frequencies and amplitudes of such other output signals.

Figure 4:
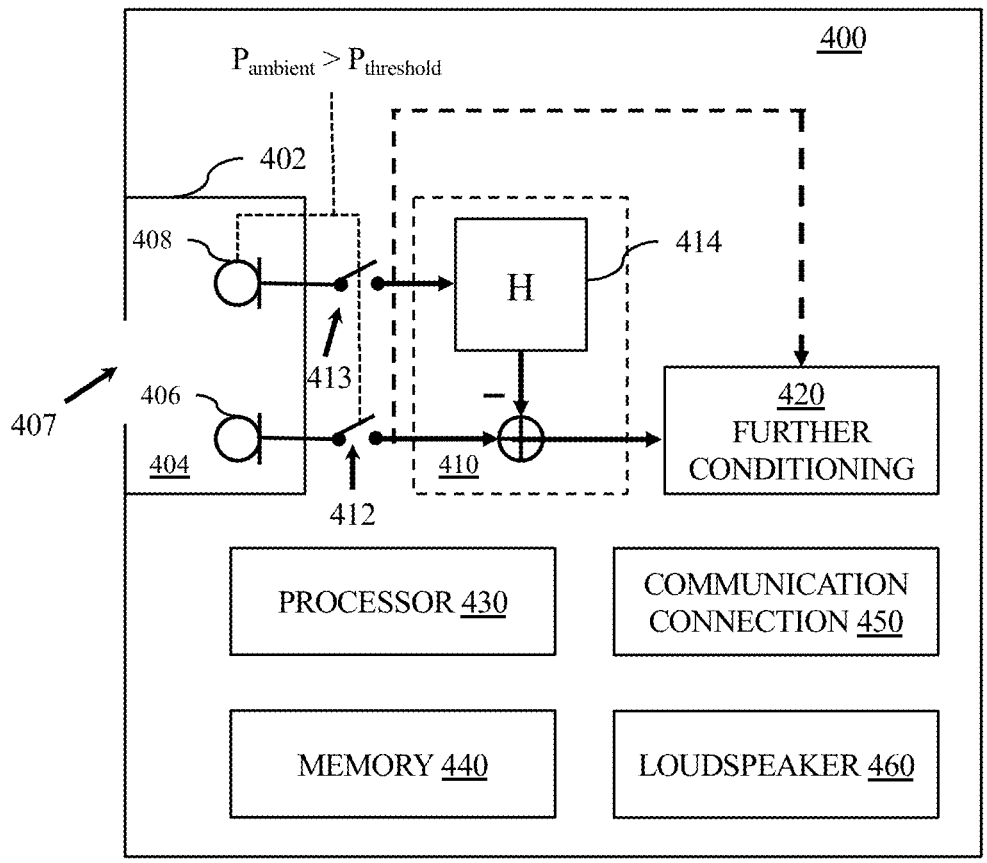
FIG. 4 illustrates a block diagram showing aspects of an audio appliance.

FIG. 4 is a schematic illustration of an audio appliance 400 similar to the audio appliance 300. The audio appliance 400 provides pressure acquisition functionality similar in some respects to the pressure acquisition unit 301 shown in FIG. 3. For example, the audio appliance 400 includes a combination sensor 402.

As well, the audio appliance 400 includes an ambient-impairment processing unit 410 that can combine, e.g., filtered, representations of one or more output signals from a first pressure-sensitive region 406 of the combination sensor 402 with another one or more output signals from a second pressure-sensitive region 408 of the combination sensor. The impairment processing unit 410 can be incorporated in an IC on the combination sensor 402, in an IC external to the combination sensor 402, or distributed between or among processing modules on the combination sensor and external to the combination sensor. As with the appliance 300, the appliance 400 has a conditioning module 420 configured to condition output from the combination sensor 402. For example, the conditioning unit 420 can condition output from the combination sensor 402 with or without having first been conditioned by the impairment conditioner 410. The dashed line with an arrowhead adjacent the conditioning unit 420 indicates that output from the combination sensor 402 may pass to the conditioning unit 420 without prior conditioning by an impairment conditioner. Further, an output signal corresponding to a response of one pressure sensitive region to pressure in the acoustic chamber 404, e.g., either of regions 406, 408, or both of them, may pass to the conditioning unit 420 without prior conditioning by a special-purpose impairment conditioner 410. Similar to the audio appliance 300, the audio appliance 400 includes a processing unit 430, a memory 440, a communication connection 450 and, optionally, a loudspeaker 460.

The combination sensor assembly 402 includes a first pressure-sensitive region 406 responsive to a corresponding first range of pressure conditions and a second pressure-sensitive region 408 responsive to a corresponding second range of pressure conditions. Although not shown, the combination sensor assembly 402 can include one or more additional pressure-sensitive regions, with each additional region being responsive to a corresponding range of pressure conditions. In FIG. 4, the first pressure-sensitive region 406 and the second pressure-sensitive region 408 are exposed to a shared chamber 404. A port 407 extends through a wall of an enclosure for the audio appliance 400, fluidically coupling an interior region of the shared chamber 404 with an ambient environment external to the appliance 400.

The enclosure for the audio appliance 400 may include a top wall or top face (e.g., coincident with the display 102 in FIG. 1), a bottom or back wall or bottom or back side (e.g., through which the combination sensor 104c opens to an ambient environment), and a side wall (e.g., through which the combination sensors 104a, 104b open to an ambient environment) connecting the top side to the bottom or back side. The combination of the top side, bottom side and side wall shown in FIG. 1 may define an open interior region, which can include the chamber 404.

In other embodiments, one or more of the sides may be formed by a substrate having circuitry formed therein (e.g. a printed circuit board). As noted, the enclosure may further include an acoustic port 407. Acoustic port 407 may, in some embodiments, be an acoustic inlet port that allows for a sound (S) from the environment surrounding the audio appliance 400 to be input to the sensing element 402 within the enclosure (e.g., for sound pick-up by, for example, the first pressure-sensitive region 406). It should be understood, however, that in other embodiments, acoustic port 407 may be used as an output port, for example, to output sound from sensing element 402 to the ambient or surrounding environment.

To sense two or more ranges of pressure conditions, each of which typically corresponds to a unique pressure-sensitive region (e.g., ambient pressure and acoustic sensing) as previously discussed, a first structure can be configured to move in response (or otherwise respond) to a first range of pressure conditions (e.g., an acoustic input) and a second structure can be configured to move in response (or otherwise respond) to a second range of pressure conditions (e.g., an ambient pressure input). For example, in one embodiment, a first moving structure may include one or more of a MEMS diaphragm, membrane, plate or the like. For example, moving structure may include a diaphragm formed during a MEMS processing operation, or a diaphragm, membrane or plate including a polyester material such as polyethylene naphthalate (PEN), polyurethane (PU) or layers of different materials (e.g., a core layer sandwiched between two aluminum layers). In some cases, portions of the MEMS diaphragm, membrane, plate or the like, may have different compliance characteristics such that some portions are relatively compliant and movable in response to a first range of pressure conditions (e.g., movable in response to an acoustic input for sound pick-up) while portions are more stiff such that they only move in response to a second range of pressure conditions (e.g., movable in response to an ambient pressure input for more general pressure sensing). It should be understood that the term "compliant" or "compliance" is intended to refer to a modulus of elasticity of a member or material used to form the member, such that a more compliant member or material means the member or material has a lower modulus of elasticity than a less compliant or "stiff" material.

For example, in the case of an acoustic input such as sound, the corresponding sound pressure waves may be high frequency or small, rapid pressure changes. Therefore, one portion of moving structure may have a compliance and/or structure that allows for it to move (e.g., vibrate) in response to these small and rapid pressure changes for acoustic sensing and transduction of sound similar to a MEMS microphone. In contrast, the ambient pressure input may, for example, be a relatively large and slow pressure change (e.g., low frequency) such as that caused by movement of the device within which sensing element 402 is implemented (e.g., walking up stairs). Moving structure may therefore also have a portion (e.g., an ambient pressure sensing portion) with a compliance and/or structure that allows for it to move in response to these low frequency pressure changes for ambient pressure sensing. This ambient pressure sensing portion may, however, remain static during the acoustic input such that any signal output corresponding to the movement of this portion (e.g., an ambient pressure output) is specific to an ambient pressure change (including an ambient pressure change arising from an impairment, such as wind noise, an occluded port 407, handling noise, scratching noise, etc.). In other words, the portion that moves in response to the acoustic input may be considered more compliant, less stiff, or have a lower Young's modulus than, the portion which responds to the ambient pressure input.

For example, a pressure-sensitive region 406 may have a compliance or modulus of elasticity such that it can move (e.g., vibrate) in response to a range of input conditions typical of sound. A range of frequency conditions for sound can be between about 20 Hz and about 50 kHz, such as, for example, between about 30 Hz and about 45 kHz, or between about 40 Hz and about 40 kHz. A range of amplitude conditions for sound can be less than about 100 Pascal (Pa, equivalent to a sound-pressure level of about 134 dB), such as, for example, between about 50 milli-Pascal and about 100 Pa, or between about 100 milli-Pascal and about 90 Pa.

The pressure-sensitive region 408 may have a compliance or modulus of elasticity suitable for sensing ambient or barometric pressure conditions. A range of frequency conditions over which ambient or barometric pressure varies can be less than about 50 Hz, such as, for example, less than about 35 Hz, or less than about 1 Hz. A range of amplitude conditions for ambient pressure changes can be as high as about 10 kilo-Pascal (kPa), such as between about 8 kPa and about 12 kPa, or greater, and standard atmospheric pressure is 101.325 kPa.

Stated differently, a pressure-sensitive region responsive to ambient pressure conditions may be considered to be less compliant or stiffer than a pressure-sensitive region responsive to sound. For example, an ambient pressure-sensitive region can be of a sufficient stiffness or compliance such that it responds to an ambient pressure input (e.g., low frequency and/or high pressure change), but does not respond to an acoustic input (e.g., high frequency and/or low pressure change). In this aspect, an acoustic sensing portion (e.g., pressure-sensitive region 406) and an ambient pressure sensing portion (e.g., pressure-sensitive region 408) may move in response to different, predetermined, pressure conditions (e.g., frequencies or amplitudes). The corresponding electrical signal output by the different portions can therefore be filtered, or otherwise processed, e.g., by an ASIC, to determine an acoustic output and an ambient pressure output or measurement using a single sensing element 402.

IV. Impairment Detection and Mitigation

Ambient impairments to a pressure-responsive device can include, by way of example, a whole or a partial occlusion of a port (e.g., port 407 in FIG. 4), or a whole or a partial occlusion of an acoustic chamber to which one or more pressure-sensitive regions of a combination sensor is exposed (e.g., chamber 404). For example, a user's hand, or a protective case for an audio appliance, may extend partially or entirely across an external aperture forming the port 407, affecting (e.g., damping) acoustic energy incident on a pressure-sensitive region of a microphone. Moreover, the user's hand or the protective case (or another impediment) can sealably urge against a periphery of the port 407 and inhibit or altogether prevent acoustic energy from entering the acoustic chamber. Nonetheless, such partial or full occlusions of an acoustic port or chamber can induce a change in pressure within the acoustic chamber 404, and that change of pressure can affect a response by a conventional microphone transducer.

For example, an occlusion can dramatically increase a pressure within the chamber, causing a traditional microphone to clip. By contrast, a combination sensor (e.g., sensor 402) can meaningfully respond to such an increase in pressure, provided that the increase in pressure falls within a range of pressure conditions to which at least one pressure-responsive region of the combination sensor is responsive.

For example, the pressure-sensitive region 406 may be responsive to pressure conditions typical of sound (e.g., microphone), and the pressure-sensitive region 408 may be responsive to pressure conditions typical of ambient or atmospheric (e.g., barometric) pressures. In this example, the pressure-sensitive region 408 may not clip in response to a pressure change arising from the occlusion, though the pressure-sensitive region 406 might. Referring still to FIG. 4, the combination sensor 402 can output a signal corresponding to each pressure-sensitive region 406, 408. Alternatively, an IC (or other processing unit) associated with the combination sensor (e.g., incorporated in a component package, distributed between a component package and another module of the audio appliance, or incorporated in the audio appliance separately from the combination sensor) may compare an output from the pressure-sensitive region 406 to a selected threshold. The IC (or other processing unit) can interrupt (e.g., indicated by the open switch 413) the output from the pressure-sensitive region 408 when the output corresponds to a pressure in the acoustic chamber 404 less than a selected threshold pressure (e.g., within a range of conditions typical of sound) and may emit the output from the pressure-sensitive region 408 when the output corresponds to a pressure in the acoustic chamber 404 greater than a selected threshold pressure. Alternative to interrupting the output corresponding to a given pressure-sensitive region, the IC (or other processing unit) can terminate an output from the pressure-sensitive region 408.

A similar arrangement also is possible. For example, the IC (or other processing unit) can interrupt the output from the pressure-sensitive region 406 (e.g., indicated by open switch 412) when the output corresponds to a pressure in the acoustic chamber 404 greater than a selected threshold pressure (e.g., outside a range of conditions typical of sound) and may emit the output from the pressure-sensitive region 406 when the output corresponds to a pressure in the acoustic chamber 404 less than a selected threshold pressure. For example, such an arrangement may be useful when the pressure-sensitive region 406 is sensitive to a range of pressure conditions typical of sound.

Yet another similar embodiment is possible. For example, when the output from the pressure-sensitive region 408 output corresponds to a pressure in the acoustic chamber 404 greater than a selected threshold pressure, the IC (or other processing unit) can emit the output signal from each of the pressure-sensitive regions 406, 408.

In any event, the further processing unit 420 (or other unit) can invoke a task or otherwise modify operation of the audio appliance 400. For example, the further processing unit 420 (or other unit) can invoke use of another combination sensor, or can adjust a noise-cancellation algorithm, or otherwise modify operation of the appliance 400. Such modified operation of the audio appliance 400 can be responsive to a signal being present (or absent) on a selected one or more output channels from the combination sensor 402, e.g., when such signal indicates that a pressure condition in the acoustic chamber 404 is outside a selected range of pressure conditions. For example, when a pressure condition in the chamber 404 is within a range of pressure conditions indicative of, e.g., an occluded port or wind noise, likely to impair observations of an intended audio source by a microphone portion of the combination sensor 402, the combination sensor can output a signal of another pressure sensitive region and/or interrupt a signal from the microphone portion. Responsive to such an output from the combination sensor, a processing or a decision unit in the audio appliance 400 can, e.g., invoke further conditioning of an output from the combination sensor, cause the audio appliance to ignore an output from the combination sensor, modify a signal processing of another microphone transducer, and/or select another microphone transducer for observing the intended audio source.

Figure 5:
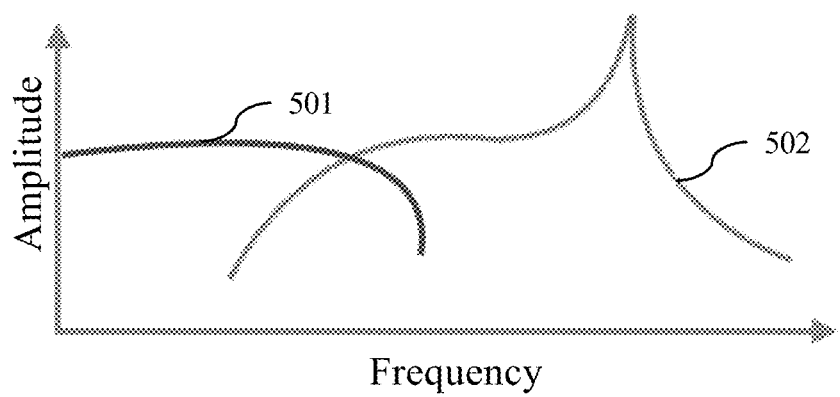
FIG. 5 illustrates an example of a first range of pressure conditions and a second range of pressure conditions to which a combination device described herein may be responsive.

Although only one interruptible output path from the combination sensor 402 is shown in FIG. 4, more than one interruptible output path from the combination sensor 402 is possible. For example, each output channel from the combination sensor 402 may be interruptible responsive to a pressure condition in the acoustic chamber 404 being outside a range of pressure conditions to which the pressure-sensitive region corresponding to that respective channel may be sensitive. Moreover, a combination sensor 402 is shown by way of illustration as having two pressure-sensitive regions 406, 408. That being said, a combination sensor 402 may have any selected number of pressure-sensitive regions, each being sensitive within a corresponding range of pressure conditions. Moreover, as shown in FIG. 5, the ranges of conditions corresponding to one pressure-sensitive region 501 may overlap with one or more other ranges 502 of conditions, or may not overlap with any other range of pressure conditions.

Impairments other than an occlusion also can affect observations of an intended audio source. For example, wind noise and noise arising from rubbing or tapping the acoustic appliance can induce a response, e.g., a vibratory response, in a pressure-sensitive region of a pressure-responsive device. Consequently, an output from a pressure-responsive device may correspond to a combination of an observation of an intended audio source and an impairment signal. In general, an ambient impairment can include impulsive, transient noises such as, for example, door slams, coughs, pops and scratches or noises generated by handling or using the acoustic device. Further examples include mechanical noise. Such mechanical noise can be caused by vibrations transmitted to a pressure-sensitive region of a pressure-responsive device from other components within and around an appliance (e.g., a loose cable connection). As well, poorly designed or damaged internal shock mounts, which although intended to reduce handling noise, may exhibit resonant behavior over a range of acoustic frequencies. Similarly, other structure onto which a pressure-responsive device may be mounted (e.g. a microphone stand) can convey a resonant vibration to a pressure-responsive device, impairing observations of an intended audio source.

Referring still to FIG. 4, an ambient-impairment processing unit 410 can process output from a combination sensor 402. In one aspect, the processing unit 410 can compensate for impairments to observations of an intended audio source. For example, the ambient-impairment processing unit 410 can modify an output from a combination sensor, e.g., in correspondence with an output from another channel of the combination sensor. Further, ambient-impairment processing unit 410 can combine the modified output with an output from another channel of the combination sensor, as depicted. For example, the filter H can model a correlation between a response of the pressure-sensitive region 408 and a response of the pressure-sensitive region 406 to a port occlusion (e.g., FIG. 5) (or other impairment). The filter H can be applied to an output of the pressure-sensitive region 406 and the modified version of that output can be combined with (e.g., subtracted from) the output corresponding to the response of the pressure-sensitive region 408. Combining the modified version of the output from one pressure-sensitive region with an output of another pressure-sensitive region of the combination sensor can compensate, in some instances, for an impairment condition. Alternatively, the audio appliance can respond to an impairment condition by interrupting, terminating, or otherwise modifying an impaired output (e.g., by limiting observations of an intended audio source using a difference microphone transducer or combination sensor having a microphone transducer).

The combined output from the processing unit 410 can be an input to the processing unit 420 and more accurately represent audio from an intended audio source. In this way, the ambient-impairment processing unit 410 may be considered as a compensation processing unit, or circuit. The ambient-impairment processing unit 410 can reduce a computational overhead imposed on the processing unit 420 and/or other processing units of an audio appliance.

Figure 7:
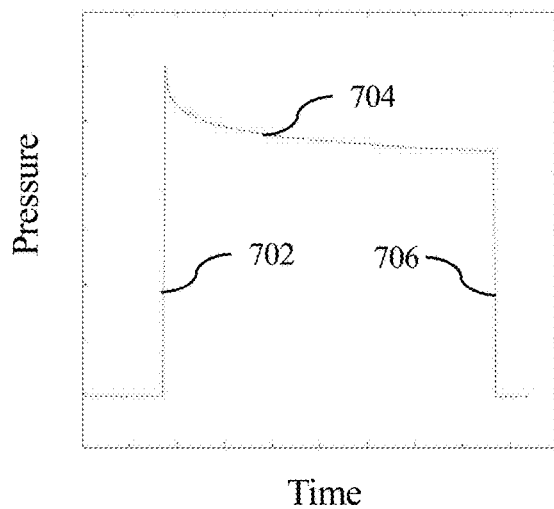
Figure 8:
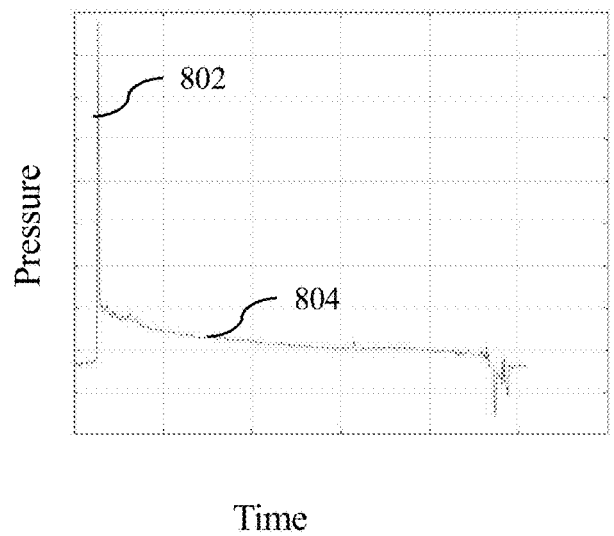
Figure 9:
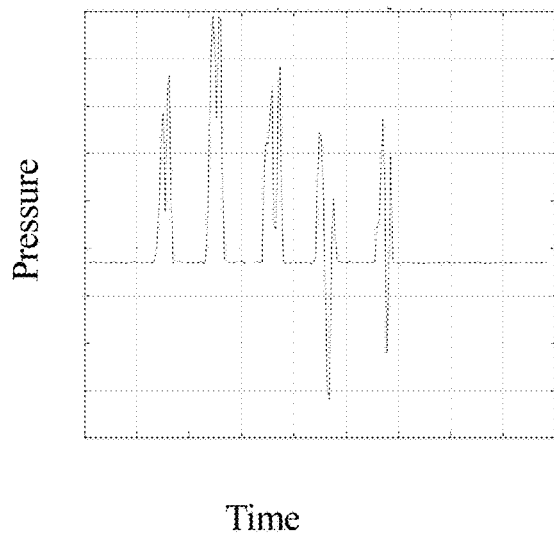

Each class of ambient impairment can have a corresponding signature of pressure conditions, e.g., variation in pressure (amplitude and frequency) over time. For example, an occlusion may manifest as a rapid increase in pressure 602 (FIG. 6), 702 (FIG. 7), followed by a logarithmic decay 604, 704 until the occlusion is removed 606, 706. As shown in FIG. 8, an injection of water (e.g., a specific type of occlusion) can manifest as a large spike in pressure 802 followed by a rapid decrease and subsequent decay 804. Such transient pressure variations can be used by an ambient-impairment processing unit to distinguish an occlusion event or condition from, for example, wind noise or handling noise. For example, wind noise may be a wide-band non-stationary signal, dominated by a low frequency component. Handling noise (FIG. 9) may be similar as wind noise, mostly caused by the pressure fluctuation.

As a consequence, observations of pressure condition, especially over a selected duration, can indicate whether an impairment condition exists. Moreover, such observations and indicate a class or type of impairment condition, as well as its strength. Further, once a type and extent of an impairment condition is identified, an ambient-impairment processing unit 410 can, in response, compensate for the impairment condition. Such compensation can improve audio observations under a variety of impairment conditions compared to conventional audio appliances that lack combination sensors and/or ambient-impairment processing units described herein.

Figure 10:
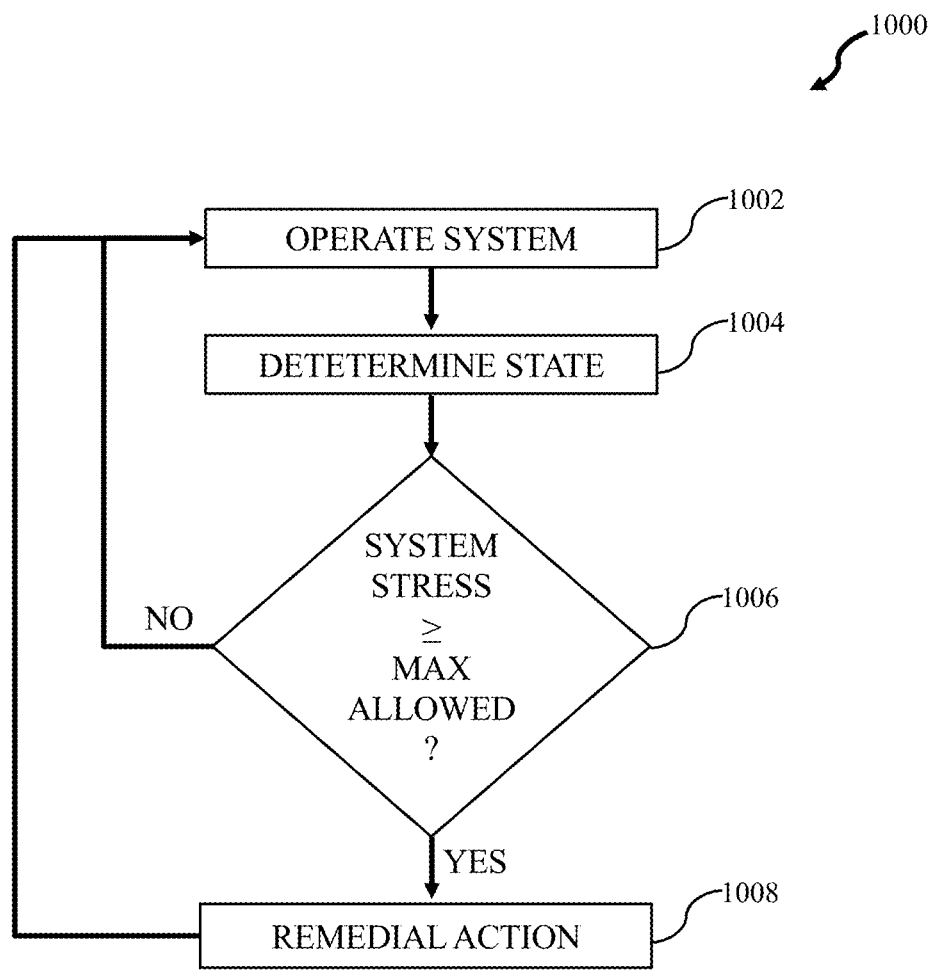
FIG. 10 illustrates a diagram of a process for mitigating effects of an ambient impairment on observations of an intended audio source.

A combination sensor 402 can observe a wide range of pressure conditions by virtue of including a plurality of pressure-sensitive regions, each being responsive to a corresponding range of pressure conditions, even though one or more pressure-sensitive regions may clip or otherwise not meaningfully respond to a given pressure condition. As shown by the process flow 1000 in FIG. 10, a combination sensor 402 can be used in combination with an ambient-impairment processing unit 410 or other processing unit (e.g., unit 420) to mitigate effects of a condition that impairs observations of an intended audio source. For example, an appliance can be operated at block 1002. A state (e.g., a pressure condition) can be determined at block 1004. For example, an ambient-impairment processing unit 410 or other processing unit (e.g., unit 420) can be programmed to recognize or identify pressure response signatures (e.g., of a type shown among FIGS. 6, 7, 8 and 9) to identify a type or class of impairment to observations of an intended audio source. For example, pressure response of a barometric portion of a combination sensor and pressure response of a microphone portion of the combination sensor may be well correlated. At block 1006, the processing unit can determine whether an observed pressure condition exceeds a threshold condition (e.g., falls outside a range of pressure conditions typical of sound). If not, the process flow returns to system operation at block 1002. If the pressure condition exceeds a threshold condition, a remedial action at block 1008 can be taken. For example, an ambient-impairment processing unit 410 or other processing unit (e.g., unit 420) can mitigate an effect of such an impairment responsive to an observed pressure condition falling outside a predetermined range of pressure conditions. Such mitigation can include, for example, compensating for a determined impairment as described above in relation to the filter H shown in FIG. 4.

In one example, a pressure condition observed by a combination sensor 402 and processed by an ambient-impairment processing or other unit can differentiate an impairment condition from, e.g., a pressure change caused by the motion or altitude change. For example, a pressure condition arising from an occlusion typically may last for a long time with a slow, predictably decay back to ambient pressure. Further, a pressure response from, e.g., an occlusion, can be used to differentiate from pressure variations caused by, for example, wind or user handling.

In another example, when a user initiates a recording session, a barometer portion of a combination sensor can be enabled together with a microphone portion of the combination sensor. Under a wind or a handling condition, the barometer can record a change of absolute pressure value. A threshold pressure may be used to determine a wind or handling noise event, e.g., when observed pressure is beyond the threshold pressure, a detector can be ON. In many instances, a barometric pressure sensor may be operated at a relatively slow data rate, for example, 1 Hz. Nonetheless, a barometric pressure portion of a combination sensor as described herein may have an adjustable or selectable sample rate, for example up to about 32 Hz. A higher sampling rate can be selected when a recording session is triggered, and the more frequently sampled barometric signal can be used in an impairment detector as described herein.

V. Computing Environments

Figure 11:
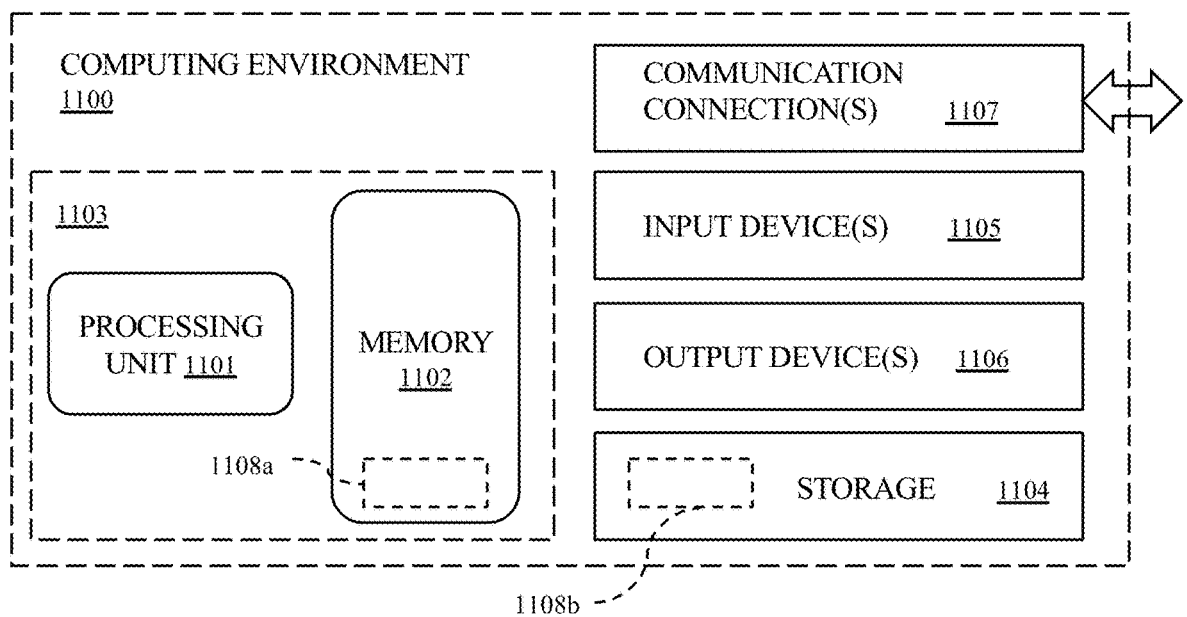
FIG. 11 illustrates a block diagram showing aspects of a computing environment.

FIG. 11 illustrates a generalized example of a suitable computing environment 1100 in which described methods, embodiments, techniques, and technologies relating, for example, to audio-input signal processing and correction on an appliance, e.g., a portable electronic device, can be implemented. The computing environment 1100 is not intended to suggest any limitation as to scope of use or functionality of the technologies disclosed herein, as each technology may be implemented in diverse general-purpose or special-purpose computing environments, including within an audio appliance. For example, each disclosed technology may be implemented with other computer system configurations, including wearable and/or handheld appliances (e.g., a mobile-communications device, such as, for example, IPHONE®/IPAD®/AIRPODS®/HOME-POD™ devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, audio appliances, and the like. Each disclosed technology may also be practiced in distributed computing environments where tasks are performed by remote processing devices that are linked through a communications connection or network. In a distributed computing environment, program modules may be located in both local and remote memory storage devices.

As used herein, a module, or functional component, may be a programmed general-purpose computer, or may be software instructions, hardware instructions, or both, that are executable by one or more processing units to perform the operations described herein.

The computing environment 1100 includes at least one central processing unit 1101 and a memory 1102. In FIG. 11, this most basic configuration 1103 is included within a dashed line. The central processing unit 1101 executes computer-executable instructions and may be a real or a virtual processor. In a multi-processing system, or in a multi-core central processing unit, multiple processing units execute computer-executable instructions (e.g., threads) to increase processing speed and as such, multiple processors can run simultaneously, despite the processing unit 1101 being represented by a single functional block.

A processing unit, or processor, can include an application specific integrated circuit (ASIC), a general-purpose microprocessor, a field-programmable gate array (FPGA), a digital signal controller, or a set of hardware logic structures (e.g., filters, arithmetic logic units, and dedicated state machines) arranged to process instructions.

The memory 1102 may be volatile memory (e.g., registers, cache, RAM), non-volatile memory (e.g., ROM, EEPROM, flash memory, etc.), or some combination of the two. The memory 1102 stores instructions for software 1108a that can, for example, implement one or more of the technologies described herein, when executed by a processor. Disclosed technologies can be embodied in software, firmware or hardware (e.g., an ASIC).

A computing environment may have additional features. For example, the computing environment 1100 includes storage 1104, one or more input devices 1105, one or more output devices 1106, and one or more communication connections 1107. An interconnection mechanism (not shown) such as a bus, a controller, or a network, can interconnect the components of the computing environment 1100. Typically, operating system software (not shown) provides an operating environment for other software executing in the computing environment 1100, and coordinates activities of the components of the computing environment 1100.

The store 1104 may be removable or non-removable, and can include selected forms of machine-readable media. In general, machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information, and which can be accessed within the computing environment 1100. The storage 1104 can store instructions for the software 1108b that can, for example, implement technologies described herein, when executed by a processor.

The store 1104 can also be distributed, e.g., over a network so that software instructions are stored and executed in a distributed fashion. In other embodiments, e.g., in which the store 1104, or a portion thereof, is embodied as an arrangement of hardwired logic structures, some (or all) of these operations can be performed by specific hardware components that contain the hardwired logic structures. The store 1104 can further be distributed, as between or among machine-readable media and selected arrangements of hardwired logic structures. Processing operations disclosed herein can be performed by any combination of programmed data processing components and hardwired circuit, or logic, components.

The input device(s) 1105 may be any one or more of the following: a touch input device, such as a keyboard, keypad, mouse, pen, touchscreen, touch pad, or trackball; a voice input device, such as one or more microphone transducers, speech-recognition technologies and processors, and combinations thereof; a scanning device; or another device, that provides input to the computing environment 1100. For audio, the input device(s) 1105 may include a microphone or other transducer (e.g., a sound card or similar device that accepts audio input in analog or digital form), or a computer-readable media reader that provides audio samples and/or machine-readable transcriptions thereof to the computing environment 1100.

Speech-recognition technologies that serve as an input device can include any of a variety of signal conditioners and controllers, and can be implemented in software, firmware, or hardware. Further, the speech-recognition technologies can be implemented in a plurality of functional modules. The functional modules, in turn, can be implemented within a single computing environment and/or distributed between or among a plurality of networked computing environments. Each such networked computing environment can be in communication with one or more other computing environments implementing a functional module of the speech-recognition technologies by way of a communication connection.

The output device(s) 1106 may be any one or more of a display, printer, loudspeaker transducer, DVD-writer, signal transmitter, or another device that provides output from the computing environment 1100. An output device can include or be embodied as a communication connection 1107.

The communication connection(s) 1107 enable communication over or through a communication medium (e.g., a connecting network) to another computing entity. A communication connection can include a transmitter and a receiver suitable for communicating over a local area network (LAN), a wide area network (WAN) connection, or both. LAN and WAN connections can be facilitated by a wired connection or a wireless connection. If a LAN or a WAN connection is wireless, the communication connection can include one or more antennas or antenna arrays. The communication medium conveys information such as computer-executable instructions, compressed graphics information, processed signal information (including processed audio signals), or other data in a modulated data signal. Examples of communication media for so-called wired connections include fiber-optic cables and copper wires. Communication media for wireless communications can include electromagnetic radiation within one or more selected frequency bands.

Machine-readable media are any available media that can be accessed within a computing environment 1100. By way of example, and not limitation, with the computing environment 1100, machine-readable media include memory 1102, storage 1104, communication media (not shown), and combinations of any of the above. As used herein, the phrase "tangible machine-readable" (or "tangible computer-readable") media excludes transitory signals.

As explained above, some disclosed principles can be embodied in a store 1104. Such a store can include tangible, non-transitory machine-readable medium (such as microelectronic memory) having stored thereon or therein instructions. The instructions can program one or more data processing components (generically referred to here as a "processor") to perform one or more processing operations described herein, including estimating, computing, calculating, measuring, detecting, adjusting, sensing, measuring, filtering, correlating, and decision making, as well as, by way of example, addition, subtraction, inversion, and comparison. In some embodiments, some or all of these operations (of a machine process) can be performed by specific electronic hardware components that contain hardwired logic (e.g., dedicated digital filter blocks). Those operations can alternatively be performed by any combination of programmed data processing components and fixed, or hardwired, circuit components.

VI. Other Exemplary Embodiments

The examples described above generally concern pressure-responsive sensors, and related systems and methods. The previous description is provided to enable a person skilled in the art to make or use the disclosed principles. Embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of pressure-responsive sensors, and related methods and systems. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features and acts claimed herein. Accordingly, neither the claims nor this detailed description shall be construed in a limiting sense, and following a review of this disclosure, those of ordinary skill in the art will appreciate the wide variety of pressure-responsive sensors, and related methods and systems that can be devised under disclosed and claimed concepts.

Moreover, nothing disclosed herein is intended to be dedicated to the public regardless of whether such disclosure is explicitly recited in the claims. No claim feature is to be construed under the provisions of 35 USC 112(f), unless the feature is expressly recited using the phrase "means for" or "step for".

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more".

Thus, in view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

We currently claim:

1. An audio appliance, comprising:
   a microphone transducer having an acoustically sensitive region to convert incident acoustic energy to a corresponding output signal;
   a barometric transducer having a pressure-responsive region to convert an ambient pressure to a corresponding output signal;
   an acoustic housing defining a chamber to fluidly couple the microphone transducer with the barometric transducer;
   a processor; and
   a memory containing instructions that, when executed by the processor, cause the audio appliance
   to determine a presence of an ambient impairment to the microphone transducer based at least in part on the output signal from the barometric transducer, and
   responsive to the determined presence of the ambient impairment to the microphone transducer, to estimate an acoustic signal corresponding to the ambient impairment and to subtract the estimated acoustic signal from the output signal from the microphone transducer.

2. The audio appliance according to claim 1, wherein the instructions that, when executed by the processor, cause the audio appliance to determine the presence of the ambient impairment to the microphone transducer comprise instructions that, when executed by the processor, cause the audio appliance to determine the presence of the ambient impairment based on a comparison of the output signal from the barometric transducer with a threshold signal.

3. The audio appliance according to claim 2, wherein the threshold signal comprises the output signal from the microphone transducer.

4. The audio appliance according to claim 1, wherein the instructions that, when executed by the processor, cause the audio appliance to estimate the acoustic signal corresponding to the ambient impairment comprise instructions that, when executed by the processor, cause the audio appliance to estimate the acoustic signal based at least on the output signal from the barometric transducer.

5. The audio appliance according to claim 1, wherein the microphone transducer comprises a first microphone transducer, the audio appliance further comprising a second microphone transducer, wherein the instructions that, when executed by the processor, cause the audio appliance to mitigate effects of the ambient impairment comprise instructions that, when executed by the processor, cause the audio appliance to receive output from the second microphone transducer and to ignore output from the first microphone transducer.

6. The audio appliance according to claim 2, wherein the instructions that, when executed by the processor, cause the audio application to mitigate effects of the ambient impairment responsive to the determined presence of the ambient impairment to the microphone transducer, comprise further instructions that, when executed by the processor, cause the audio appliance to communicate an output from the barometric pressure transducer to an ambient-impairment processing unit.

7. The audio appliance according to claim 2, wherein the instructions that, when executed by the processor, cause the audio application to mitigate effects of the ambient impairment responsive to the determined presence of the ambient impairment to the microphone transducer, comprise further instructions that, when executed by the processor, cause the audio appliance to interrupt the output signal from the microphone transducer.

8. A pressure-responsive device, comprising:
   an enclosure defining an acoustic chamber, wherein the enclosure further defines a port opening to the acoustic chamber and acoustically coupling the acoustic chamber with an external environment;
   a first pressure-responsive region exposed to the acoustic chamber and responsive to a first range of pressure conditions;
   a second pressure-responsive region exposed to the acoustic chamber and responsive to a second range of pressure conditions;
   output circuitry configured to output a first signal corresponding to a response of the first pressure-responsive region to a pressure condition in the acoustic chamber, wherein the output circuitry is further configured to output a second signal responsive to the pressure condition in the acoustic chamber being outside the first range of pressure conditions.

9. The pressure-responsive device according to claim 8, wherein the output circuitry is further configured to interrupt the output of the first signal responsive to the pressure condition in the acoustic chamber being outside the first range of pressure conditions.

10. The pressure-responsive device according to claim 8, wherein the second signal corresponds to a response of the second pressure-responsive region to the pressure condition in the acoustic chamber.

11. The pressure-responsive device according to claim 8, further comprising compensation circuitry configured to modify the first signal in correspondence with a response of the second pressure-responsive region to the pressure condition in the acoustic chamber.

12. The pressure-responsive device according to claim 8, wherein the output circuitry is further configured to interrupt the output of the second signal responsive to the pressure condition in the acoustic chamber being within the first range of pressure conditions.

13. The pressure-responsive device according to claim 8, wherein the second signal comprises a modified version of the first signal.

14. The pressure-responsive device according to claim 8, wherein the first range of pressure conditions comprises frequencies up to about 40 kHz and amplitudes between about 25 milli-Pascal (mPa) and about 100 Pascal (Pa) above a reference pressure.

15. The pressure-responsive device according to claim 8, wherein the first pressure-responsive region is responsive to the first range of pressure conditions without clipping.

16. The pressure-responsive device according to claim 8, the second pressure-responsive region is responsive to the second range of pressure conditions without clipping.

17. The pressure-responsive device according to claim 16, wherein the second range of pressure conditions comprises a pressure greater than about 100 Pascal (Pa) above a reference pressure.

18. The pressure-responsive device according to claim 8, further comprising compensation circuitry configured to modify the first signal responsive to the pressure condition in the acoustic chamber being outside the first range of pressure conditions.

19. The pressure-responsive device according to claim 8, further comprising compensation circuitry configured to interrupt the first signal responsive to the pressure condition in the acoustic chamber being outside the first range of pressure conditions.

20. The pressure-responsive device according to claim 19, wherein the circuitry is further configured, responsive to the determined presence of the ambient impairment to the port, to mitigate effects of the ambient impairment.

21. The pressure-responsive device according to claim 19, wherein the circuitry configured to determine the presence or the absence of the ambient impairment is further configured to make the determination based on a comparison of the output signal from the second sensitive region with a threshold.

22. The pressure-responsive device according to claim 21, wherein the threshold comprises an upper threshold of the first range of pressure conditions.

23. An audio appliance, comprising:
    a housing having a housing wall defining a port open to a region external of the housing;
    an acoustic chamber positioned within the housing, wherein the port opens to the acoustic chamber and acoustically couples the acoustic chamber with the region external of the housing;
    a pressure-responsive transducer having a first pressure-responsive region responsive to a first range of pressure conditions and a second pressure-responsive region responsive to a second range of pressure conditions, wherein the first pressure-responsive region is acoustically coupled with the acoustic chamber and the second pressure-responsive region is acoustically coupled with the acoustic chamber, wherein the pressure-responsive transducer is configured to output a signal corresponding to one or both of a response of the first pressure-responsive region to a pressure condition in the acoustic chamber and a response of the second pressure-responsive region to a pressure condition in the acoustic chamber; and
    circuitry configured to modify an output from the pressure-responsive transducer responsive to and in correspondence with a pressure condition in the acoustic chamber being outside the first range of pressure conditions.

* * * * *